United States Patent
Wallrabenstein et al.

(10) Patent No.: US 10,425,235 B2
(45) Date of Patent: Sep. 24, 2019

(54) DEVICE AND SYSTEM WITH GLOBAL TAMPER RESISTANCE

(71) Applicant: Analog Devices, Inc., Norwood, MA (US)

(72) Inventors: John Ross Wallrabenstein, West Lafayette, IN (US); Thomas Joseph Brindisi, Key West, FL (US)

(73) Assignee: Analog Devices, Inc., Norwood, MA (US)

( * ) Notice: Subject to any disclaimer, the term of this patent is extended or adjusted under 35 U.S.C. 154(b) by 77 days.

(21) Appl. No.: 15/613,088

(22) Filed: Jun. 2, 2017

(65) Prior Publication Data

US 2018/0351752 A1    Dec. 6, 2018

(51) Int. Cl.
*G06F 21/72* (2013.01)
*H04L 9/32* (2006.01)
*H04L 9/00* (2006.01)

(52) U.S. Cl.
CPC ............ *H04L 9/3278* (2013.01); *G06F 21/72* (2013.01); *H04L 9/002* (2013.01); *H04L 2209/12* (2013.01)

(58) Field of Classification Search
CPC combination set(s) only.
See application file for complete search history.

(56) References Cited

U.S. PATENT DOCUMENTS

| | | |
|---|---|---|
| 6,501,390 B1 | 12/2002 | Chainer et al. |
| 7,564,345 B2 | 7/2009 | Devadas et al. |
| 7,581,248 B2 | 8/2009 | Atkins et al. |
| 7,653,197 B2 | 1/2010 | Van Dijk |

(Continued)

FOREIGN PATENT DOCUMENTS

| | | | |
|---|---|---|---|
| EP | 2320344 A2 * | 11/2006 | ............. G06F 21/00 |
| EP | 2 320 344 A2 | 7/2011 | |

(Continued)

OTHER PUBLICATIONS

Asaeda, "Structuring Proactive Secret Sharing in Mobile Ad-hoc Networks," Jan. 18, 2006, International Symposium on Wireless Pervasive Computing.*

(Continued)

*Primary Examiner* — Khoi V Le (74) *Attorney, Agent, or Firm* — Wolf, Greenfield & Sacks, P.C.

(57) ABSTRACT

Various embodiments enhance security and tamper resistance of device or components having a hardware intrinsic identity. For example, devices or components having PUFs can map challenges and helper values to a secret or share of secret to utilize a local identity in cryptographic operations. A plurality of components having individual identities can be extend so that the plurality of components can enroll into a shared global identity. Shares of the global identity can be distributed among the plurality of components or devices such that at least two devices must provide at least two shares of the global identity (or threshold operations on the at least two shares) to successfully use the global identity. Such sharing mitigates adversarial tampering attack on the global identity. Share refresh protocols can provide additional security, enable introduction of new components or devices to the global identity, and allow removal of existing components or devices.

20 Claims, 5 Drawing Sheets

(56) References Cited

U.S. PATENT DOCUMENTS

| | | | |
|---|---|---|---|
| 7,702,927 B2 | 4/2010 | Devadas et al. | |
| 7,839,278 B2 | 11/2010 | Devadas et al. | |
| 7,926,089 B2 | 4/2011 | Tulshibagwale et al. | |
| 7,962,516 B2 | 6/2011 | Bahrs et al. | |
| 8,032,760 B2 | 10/2011 | Tuyls et al. | |
| 8,281,127 B2 | 10/2012 | Hayes | |
| 8,290,150 B2 | 10/2012 | Erhart et al. | |
| 8,346,951 B2 | 1/2013 | Hayes | |
| 8,379,856 B2 | 2/2013 | Potkonjak | |
| 8,386,990 B1 | 2/2013 | Trimberger et al. | |
| 8,418,006 B1 | 4/2013 | Trimberger et al. | |
| 8,446,250 B2 | 5/2013 | Kursawe et al. | |
| 8,458,489 B2 | 6/2013 | Beckmann et al. | |
| 8,463,813 B2 | 6/2013 | Siress et al. | |
| 8,468,186 B2 | 6/2013 | Yu | |
| 8,510,608 B2 | 8/2013 | Futa et al. | |
| 8,516,269 B1 | 8/2013 | Hamlet et al. | |
| 8,525,169 B1 | 9/2013 | Edelstein et al. | |
| 8,566,579 B2 | 10/2013 | Armstrong et al. | |
| 8,577,091 B2 | 11/2013 | Ivanov et al. | |
| 8,625,788 B2 | 1/2014 | Pendakur et al. | |
| 8,667,265 B1 | 3/2014 | Hamlet et al. | |
| 8,752,155 B2 | 6/2014 | Lauper | |
| 8,782,396 B2 | 7/2014 | Ziola et al. | |
| 8,844,009 B2 | 9/2014 | Walsh et al. | |
| 8,848,477 B2 * | 9/2014 | Schrijen | G06F 7/588 |
| | | | 365/185.04 |
| 8,848,905 B1 | 9/2014 | Hamlet et al. | |
| 8,868,923 B1 | 10/2014 | Hamlet et al. | |
| 8,912,817 B2 | 12/2014 | Wang et al. | |
| 8,918,647 B1 * | 12/2014 | Wallrabenstein | H04L 63/0853 |
| | | | 713/172 |
| 8,995,660 B2 | 3/2015 | Kobayashi et al. | |
| 9,018,972 B1 | 4/2015 | Gurrieri et al. | |
| 9,032,476 B2 | 5/2015 | Potkonjak | |
| 9,038,133 B2 | 5/2015 | Chellappa et al. | |
| 9,158,906 B2 | 10/2015 | Guajardo Merchan et al. | |
| 9,225,512 B1 | 12/2015 | Trimberger | |
| 9,292,692 B2 | 3/2016 | Wallrabenstein | |
| 9,672,342 B2 | 6/2017 | Walsh et al. | |
| 9,681,302 B2 | 6/2017 | Robinton et al. | |
| 9,690,927 B2 | 6/2017 | Chellappa et al. | |
| 9,705,854 B2 | 7/2017 | Khazan et al. | |
| 9,715,590 B2 | 7/2017 | Gardner et al. | |
| 9,806,718 B2 | 10/2017 | Wallrabenstein | |
| 9,946,858 B2 | 4/2018 | Wallrabenstein | |
| 10,013,543 B2 | 7/2018 | Walsh et al. | |
| 2003/0081785 A1 | 5/2003 | Boneh et al. | |
| 2003/0088782 A1 | 5/2003 | Forrest | |
| 2003/0204743 A1 | 10/2003 | Devadas et al. | |
| 2005/0149496 A1 | 7/2005 | Mukherjee et al. | |
| 2005/0222896 A1 | 10/2005 | Rhyne et al. | |
| 2006/0023887 A1 | 2/2006 | Agrawal et al. | |
| 2006/0045262 A1 | 3/2006 | Orlando | |
| 2006/0210082 A1 | 9/2006 | Devadas et al. | |
| 2007/0036353 A1 | 2/2007 | Reznik et al. | |
| 2007/0044139 A1 | 2/2007 | Tuyls et al. | |
| 2007/0206786 A1 | 9/2007 | Chakraborty | |
| 2008/0069341 A1 | 3/2008 | Relyea | |
| 2008/0133912 A1 | 6/2008 | Yamamoto et al. | |
| 2008/0181398 A1 | 7/2008 | Pappu | |
| 2008/0256549 A1 | 10/2008 | Liu et al. | |
| 2008/0256600 A1 | 10/2008 | Schrijen et al. | |
| 2009/0063860 A1 | 3/2009 | Barnett et al. | |
| 2009/0083833 A1 | 3/2009 | Ziola et al. | |
| 2010/0037056 A1 | 2/2010 | Follis et al. | |
| 2010/0122093 A1 * | 5/2010 | Tuyls | G06F 21/33 |
| | | | 713/180 |
| 2010/0127822 A1 | 5/2010 | Devadas | |
| 2010/0176920 A1 | 7/2010 | Kursawe et al. | |
| 2010/0272255 A1 | 10/2010 | Devadas et al. | |
| 2010/0293384 A1 | 11/2010 | Potkonjak | |
| 2010/0293612 A1 | 11/2010 | Potkonjak | |
| 2011/0002461 A1 | 1/2011 | Erhart et al. | |
| 2011/0033041 A1 | 2/2011 | Yu et al. | |
| 2011/0099117 A1 | 4/2011 | Schepers et al. | |
| 2011/0113392 A1 | 5/2011 | Chakraborty et al. | |
| 2011/0138475 A1 | 6/2011 | Gordon et al. | |
| 2011/0191837 A1 | 8/2011 | Guajardo Merchan et al. | |
| 2011/0215829 A1 | 9/2011 | Guajardo Merchan et al. | |
| 2011/0299678 A1 | 12/2011 | Deas et al. | |
| 2012/0072717 A1 | 3/2012 | Hayes | |
| 2012/0072737 A1 | 3/2012 | Schrijen et al. | |
| 2012/0124385 A1 | 5/2012 | Klasen et al. | |
| 2012/0131340 A1 | 5/2012 | Teuwen et al. | |
| 2012/0137137 A1 | 5/2012 | Brickell et al. | |
| 2012/0183135 A1 * | 7/2012 | Paral | H04L 9/0866 |
| | | | 380/44 |
| 2012/0233674 A1 | 9/2012 | Gladstone et al. | |
| 2012/0321077 A1 | 12/2012 | Shiota et al. | |
| 2013/0046990 A1 * | 2/2013 | Fahrny | H04L 63/08 |
| | | | 713/176 |
| 2013/0051552 A1 | 2/2013 | Handschuh et al. | |
| 2013/0094649 A1 | 4/2013 | Tomlinson et al. | |
| 2013/0114810 A1 | 5/2013 | Kobayashi et al. | |
| 2013/0138710 A1 | 5/2013 | Yamamoto et al. | |
| 2013/0142329 A1 | 6/2013 | Bell et al. | |
| 2013/0198838 A1 | 8/2013 | Schmidt et al. | |
| 2013/0246809 A1 | 9/2013 | Beckmann et al. | |
| 2013/0272521 A1 | 10/2013 | Kipnis et al. | |
| 2014/0047565 A1 | 2/2014 | Baek et al. | |
| 2014/0093074 A1 | 4/2014 | Gotze et al. | |
| 2014/0108786 A1 * | 4/2014 | Kreft | G06F 21/71 |
| | | | 713/156 |
| 2014/0140513 A1 | 5/2014 | Brightley et al. | |
| 2014/0189890 A1 | 7/2014 | Koeberl et al. | |
| 2014/0205089 A1 | 7/2014 | Irwin | |
| 2014/0225639 A1 | 8/2014 | Guo et al. | |
| 2014/0279532 A1 | 9/2014 | Tremlet | |
| 2015/0058928 A1 | 2/2015 | Guo et al. | |
| 2015/0071432 A1 | 3/2015 | Zhu et al. | |
| 2015/0095655 A1 | 4/2015 | Sherman | |
| 2015/0134966 A1 | 5/2015 | Wallrabenstein | |
| 2015/0143130 A1 | 5/2015 | Ducharme et al. | |
| 2015/0192637 A1 | 7/2015 | Falk et al. | |
| 2015/0195088 A1 | 7/2015 | Rostami et al. | |
| 2015/0234751 A1 | 8/2015 | Van der Sluis et al. | |
| 2015/0242620 A1 | 8/2015 | Newell et al. | |
| 2015/0278505 A1 | 10/2015 | Lu et al. | |
| 2015/0317480 A1 | 11/2015 | Gardner et al. | |
| 2015/0317481 A1 | 11/2015 | Wallrabenstein | |
| 2015/0318994 A1 | 11/2015 | Walsh et al. | |
| 2015/0341792 A1 | 11/2015 | Wallrabenstein et al. | |
| 2016/0021096 A1 | 1/2016 | Wallrabenstein | |
| 2016/0154981 A1 * | 6/2016 | Wesselhoff | G06F 21/87 |
| | | | 726/34 |
| 2016/0170907 A1 | 6/2016 | Walsh et al. | |
| 2016/0261409 A1 | 9/2016 | French et al. | |
| 2016/0269186 A1 | 9/2016 | Wallrabenstein | |
| 2016/0378983 A1 | 12/2016 | Spurlock et al. | |
| 2017/0063559 A1 | 3/2017 | Wallrabenstein et al. | |
| 2017/0132434 A1 | 5/2017 | Wang et al. | |
| 2017/0149572 A1 * | 5/2017 | Wallrabenstein | H03K 19/17748 |
| 2017/0270288 A1 | 9/2017 | Walsh et al. | |
| 2018/0248706 A1 | 8/2018 | Wallrabenstein | |
| 2018/0351753 A1 | 12/2018 | Gardner et al. | |
| 2018/0351754 A1 | 12/2018 | Wallrabenstein et al. | |

FOREIGN PATENT DOCUMENTS

| | | |
|---|---|---|
| KR | 20090104421 A | 10/2009 |
| WO | WO 2010/105993 A2 | 9/2010 |
| WO | WO 2014/037812 A1 | 3/2014 |
| WO | WO 2015/200196 A1 | 12/2015 |
| WO | WO 2016/141386 A1 | 9/2016 |

OTHER PUBLICATIONS

Asaeda, "Structuring Proactive Secret Sharing in Mobile Ad-hoc Networks," Jan. 18, 2006, International Symposium on Wireless Pervasive Computing, 6 pages.*

(56) References Cited

OTHER PUBLICATIONS

Extended European Search Report dated Jan. 18, 2018 in connection with European Application No. 15811003.1.
Duren et al., Resilient Device Authentication System (RDAS) through Siometrics. Eighth Annual Cyber Security and Information Intelligence Workshop. ACM. 2012; pp. 1-4.
Eiroa, Hardware authentication based on PUFs and SHA-3 2nd round candidates. IEEE. 2009; pp. 1-4.
Shpantzer, Implementing Hardware Roots of Trust: The Trusted Platform Module Comes of Age. A SANS Whitepaper. Jun. 2013, pp. 1-17.
Zhao et al., Providing Root of Trust for ARM TrustZone using On-Chip SRAM. TrustED '14. ACM. Nov. 3, 2014; pp. 25-36.
International Search Report and Written Opinion dated Sep. 16, 2015 for Application No. PCT/US2015/036937.
International Preliminary Report on Patentability dated Jun. 16, 2016 for Application No. PCT/US2015/036937.
International Preliminary Report on Patentability dated Sep. 14, 2017 in connection with International Application No. PCT/US2016/021275.
Abercrombie et al., Secure Cryptographic Key Management System (CKMS) Considerations for Smart Grid Devices. CSIIRW '11 Proceedings of the Seventh Annual Workshop on Cyber Security and Information Intelligence Research, Oak Ridge, TN. Article No. 59. Oct. 12-14, 2011. 4 pages.
Goldwasser et al., One-time programs, Proceedings of the 28th Annual conference on Cryptology: Advances in Cryptology. Crypto 2008. 2008;39-56.
Guajardo et al., FPGA intrinsic PUFs and Their Use for IP Protection. Proceedings of the 9th Cryptographic Hardware and Embedded Systems Workshop (CHES). 2007;4727. 22 pages.
Guajardo et al., Physical Unclonable Functions and Public-Key Crypto for FPGA IP Protection. International Conference on Field Programmable Logic and Applications. 2007. 8 pages.
Horstmeyer et al., Physically secure and fully reconfigurable data storage using optical scattering. IEEE International Symposium on Hardware Oriented Security and Trust (HOST). 2015;157-62. 6 pages.
Kerr et al., PEAR: A Hardware Based Protocol Authentication System. Springl '10 Proceedings of the 3rd ACM 3IGSPATIAL International Workshop on Security and Privacy in GIS and LBS. 2010. 8 pages.
Kerr, Secure Physical System Design Leveraging Puf Technology. Purdue University. Thesis. May 2012. 87 pages.
Khandavilli, A Mobile Role Based Access Control System Using Identity Based Encryption With Non-Interactive 7ero Knowledge Proof of Authentication. Dalhousie University Repository, Faculty of Graduate Studies. Thesis. Apr. 5, 2012. 65 pages.
Kirkpatrick et al., Enforcing Physically Restricted Access Control for Remote Data. Proceedings of Codaspy. 2011. 10 pp.
Kirkpatrick et al., Physically Restricted Authentication and Encryption for Cyber-physical Systems. DHS Workshop on Future Directions in Cyber-physical Systems Security. 2009. 5 pages.
Kish et al., Physical Uncloneable Function Hardware Keys Utilizing Kirchhoff-Law Johnson-Noise Secure Key Exchange and Noise-Based Logic. Fluctuation Noise Lett. 2013;12. 9 pages.
Lao et al., Reconfigurable architectures for silicon physical unclonable functions. IEEE International Conference on Electro/ Information Technology (EIT). 2011;1-7.
Maes et al., Intrinsic PUFs from flip-flops on reconfigurable devices. 3rd Benelux Workshop on Information and System Security (WISSec 2008). 2008. 17 pages.
Maiti et al., Physical Unclonable Function and True Random Number Generator: a Compact and Scalable implementation. GLSVLSI '09 Proceedings of the 19th ACM Great Lakes Symposium on VLSI. 2009. 4 pages.
Potkonjak et al., Differential Public Physically Unclonable Functions: Architecture and Applications. DAC '11 Proceedings of the 48th Design Automation Conference. 2011. 7 pages.

Rust, ed., D1.1: Report on use case and architecture requirements. Seventh Framework Programme. Holistic Approaches for Integrity of ICT-Systems. ICT-317930. Feb. 28, 2013. 50 pages.
Tuyls et al., Capacity and Examples of Template Protecting Biometric Authentication Systems. Biometric Authentication. 2004;3087:158-70. 13 pages.
Yu et al., Secure and robust error correction for physical unclonable functions. IEEE Des Test. Jan. 2010;27(1):48-65.
Zhang et al., Exploiting Process Variation and Programming Sensitivity of Phase Change Memory for Reconfigurable Physical Unclonable Functions. IEEE Trans Info Forensics Sec. 2014;9(6):921-32.
International Search Report and Written Opinion dated Jun. 3, 2016 for Application No. PCT/US2016/021264.
International Search Report and Written Opinion dated Jun. 3, 2016 for Application No. PCT/US2016/021275.
[No Author Listed], D6.5: Publishable Summary. HINT. Seventh Framework Programme. Project 317930. Dec. 11, 2013.5 pages.
Abe et al., Adaptively Secure Feldman VSS and Applications to Universally-Composable Threshold Cryptography. Advances in Cryptology. Crypto 2004. 2004;3152:317-34.
Al Ibrahim et al., Cyber-Physical Security Using System-Level PUFs. 7th International IEEE Wireless Communications and Mobile Computing Conference (IWCMC). 2011. 5 pages.
Armknecht et al., A Formal Foundation for the Security Features of Physical Functions. Proceedings of the 2011 IEEE Symposium on Security and Privacy, SP '11. 2011;397-412.
Asaeda et al., Structuring Proactive Secret Sharing in Mobile Ad-hoc Networks. 2006 1st International Symposium on Wireless Pervasive Computing. Jan. 18, 2006. 6 pages.
Asim et al., Physical Unclonable Functions and Their Applications to Vehicle System Security. Vehicular Technology Conference, VTC Spring 2009. 10 pages.
Becker et al., Stealthy Dopant-Level Hardware Trojans. Crytographic Hardware and Embedded Systems, CHES 2013. 2013;8086:197-214. 18 pages.
Bilgin et al., A More Efficient AES Threshold Implementation. Cryptology ePrint Archive. Report 2013/967. 2013. 17 pages.
Blakley, Safeguarding cryptographic keys. Proceedingsof the 1979 AFIPS National Computer Conference. 1979;313-7.
Brzuska et al., Physically Uncloneable Functions in the Universal Composition Framework. Advances in Cryptology—Crypto 2011—31st Annual Cryptology Conference. 2011;6841:51-70.
Changgen et al., Threshold Signcryption Scheme Based on Elliptic Curve Cryptosystem and Verifiable Secret Sharing. International Conference on Wireless Communications, Networking and Mobile Computing. 2005;2:1136-9.
Chen et al., An efficient threshold group signature scheme. IEEE Region 10 Conference Tencon. 2004;2(B):13-6.
Coron, Resistance Against Differential Power Analysis for Elliptic Curve Cryptosystems. Crytpographic Hardware and Embedded Systems. 1999;1717:292-302.
Dodis et al., Fuzzy Extractors: How to Generate Strong Keys from Biometrics and Other Noisy Data. Eurocrypt 2004. 2004;3027:523-40.
Duc et al., A survey on RFID security and provably secure grouping-proof protocols. Int J Internet Tech Secured Trans. 2010;2(3/4):222-249.
Dwoskin et al., Hardware-rooted Trust for Secure Key Management and Transient Trust. Proceedings of the 14th ACM Conference: Computer & Communications Security. Nov. 2, 2007;389-400.
Eichhorn et al., Logically Reconfigurable PUFs: Memory-based Secure Key Storage. Proceedings of the Sixth ACM Workshop on Scalable Trusted Computing, STC '11. Oct. 17, 2011;59-64. 6 pages.
Ertaul et al., ECC Based Threshold Cryptography for Secure Data Forwarding and Secure Key Exchange in MANET (I). Networking 2005, Networking Technologies, Services, and Protocols; Performance of Computer and Communication Networks; Mobile and Wireless Communications Systems. 2005;3462:102-13.
Feiri et al., Efficient and Secure Storage of Private Keys for Pseudonymous Vehicular Communication. ACM CyCAR '13. Nov. 4, 2013;9-18.

(56) References Cited

OTHER PUBLICATIONS

Feldman, A Practical Scheme for Non-interactive Verifiable Secret Sharing. Proceedings of the 28th Annual Symposium on Foundations of Computer Science, SFCS '87. 1987;427-37.

Frankel et al., Optimal-Resilience Proactive Public-Key Cryptosystems. 38th Annual Symposium on Foundations of Computer Science. 1997;384-93. 12 pages.

Frikken et al., Robust Authentication using Physically Unclonable Functions. Information Security, ISC. 2009;5735:262-77.

Garcia-Alfaro et al., Security Threat Mitigation Trends in Low-cost RFID Systems. Data Privacy Management and Autonomous Spontaneous Security. 2010. 15 pages.

Gardner et al., Toward Trusted Embedded Systems. 2nd Annual NSA Trusted Computing Conference and Exposition. Orlando, FL. Sep. 20, 2011. 25 pages.

Gassend et al., Silicon Physical Random Functions. Proceedings of the 9th ACM Conference on Computer and Communications Security, CCS '02. 2002;148-60.

Gennaro et al., Secure Applications of Pedersen's Distributed Key Generation Protocol. Topics in Cryptology. CT-RSA 2003. 2003;2612:373-90.

Gennaro et al., Secure Distributed Key Generation for Discrete-Log Based Cryptosystems. Advances in Cryptology. Eurocrypt 99. Apr. 19, 1999;1592:295-310. 15 pages.

Handschuh et al., Hardware Intrinsic Security from Physically Unclonable Functions. Towards Hardware-Intrinsic Security, Information Security and Cryptography. 2010;39-53.

Herzberg et al., Proactive Public Key and Signature Systems. Proceedings of the 4th ACM Conference on Computer and Communications Security. CCS '97. 1997;100-10. 11 pages.

Herzberg et al., Proactive Secret Sharing or: How to Cope With Perpetual Leakage. Advances in Cryptology. Crypto 95. 1995;963:339-52.

Holcomb et al., Initial SRAM State as a Fingerprint and Source of True Random Numbers for RFID Tags. Proceedings of the Conference on RFID Security. 2007. 12 pages.

Hori et al., Quantitative and Statistical Performance Evaluation of Arbiter Physical Unclonable Functions on FPGAs. 2010 International Conference on Reconfigurable Computing and FPGAs (ReConFiq). 2010;298-303. 6 pages.

Huang et al., To verify embedded system software integrity with TCM and FPGA. IEEE. Aug. 2010;65-70.

Hua-Qun et al., Verifiable (t, n) Threshold Signature Scheme based on Elliptic Curve. Wuhan Univ J Nat Sci. 2005;10(1):165-8.

Ibrahim et al., A Robust Threshold Elliptic Curve Digital Signature Providing a New Verifiable Secret Sharing Scheme. IEEE 46th Midwest Symposium on Circuits and Systems. 2003;1:276-80. 5 pages.

Jarecki et al., Adaptively Secure Threshold Cryptography: Introducing Concurrency, Removing Erasures (Extended Abstract). Advances in Cryptology. Eurocrypt 2000. 2000;1807:223-45.

Juels et al., A Fuzzy Commitment Scheme. Proceedings of the 6th ACM Conference on Computer and Communications Security, CCS '99. 1999;28-36. 9 pages.

Karakoyunlu et al., Differential template attacks on PUF enable cryptographic devices. IEEE International Workshop on Information Forensics and Security (WIFS). Dec. 12-15, 2010;1-6.

Katzenbeisser et al., PUFs: Myth, Fact or Busted? A Security Evaluation of Physically Unclonable Functions (PUFs) Cast in Silicon (Extended Version). Cryptographic Hardware and Embedded Systems—CHES '12. 2012;283-301. 18 pages.

Katzenbeisser et al., Recyclable PUFs: logically reconfigurable PUFs. J Cryto Eng. 2011;1(3):177-86. 15 pages.

Khoshroo, Design and Evaluation of FPGA-Based Hybrid Physically Unclonable Functions. Thesis. Graduate Program in Electrical and Computer Engineering. Western University. London, Ontario, Canada. May 2013. 107 pages.

Kim et al., Threshold Signature Schemes for ElGamal Variants. Comp Stan Interf. 2011;33(4):432-7.

Kirkpatrick et al., PUF ROKs: A Hardware Approach to Read-Once Keys. Proceedings of the 6th ACM Symposium on Information, Computer and Communications Security, ASIACCS '11. 2011;155-64.

Kirkpatrick et al., Software Techniques to Combat Drift in PUF-based Authentication Systems. Workshop on Secure Component and System Identification. 2010. 9 pages.

Kocher et al., Differential Power Analysis. Proceedings of the 19th Annual International Cryptology Conference on Advances in Cryptology, Crypto '99. 1999;388:97. 10 pages.

Kocher et al., Introduction to Differential Power Analysis. J Cryptogr Eng. Mar. 3, 2011;1:5-27.

Krzywiecki et al., Coalition Resistant Anonymous Broadcast Encryption Scheme Based on PUF. TRUST 2011. 2011;6740:48-62.

Krzywiecki et al., Collusion Resistant Anonymous Broadcast Encryption Scheme Based on PUF. TRUST 2011. Jun. 22-24, 2011. 93 pages.

Kumar et al., Extended abstract: The Butterfly PUF Protecting IP on Every FPGA. IEEE International Workshop on Hardware-Oriented Security and Trust. 2008;67-70. 4 pages.

Kursawe et al., Reconfigurable Physical Unclonable Functions—Enabling Technology for Tamper-Resistant Storage. 2009 IEEE International Hardware-Oriented Security and Trust, HOST '09. 2009;22-9.

Langheinrich et al., Practical Minimalist Cryptography for RFID Privacy. IEEE Sys J. Dec. 2007;1(2). 19 pages.

Langheinrich et al., RFID Privacy Using Spatially Distributed Shared Secrets. International Symposium on Ubiquitous Computing Systems (UCS). 2007;1-16.

Lee et al., A technique to build a secret key in integrated circuits for identification and authentication applications. IEEE Symposium on VLSI Circuits: Digest of Technical Papers. 2004;176-9. 4 pages.

Libert et al., Adaptively Secure Non-Interactive Threshold Cryptosystems. Automata, Languages and Programming. 2011;588-600. 23 pages.

Maiti et al., The Impact of Aging on an FPGA-Based Physical Unclonable Function. International Conference on Field Programmable Logic and Applications (FPL). 2011;151-6.

Maiti, A Systematic Approach to Design an Efficient Physical Unclonable Function. Virginia Polytechnic Institute and State University. Dissertation. Apr. 30, 2012. 166 pages.

Majzoobi et al., Techniques for Design and Implementation of Secure Reconfigurable PUFs. ACM Trans Reconfig Tech Sys. Mar. 2009;2(1):5.1-33.

Merli et al., Semi-invasive EM Attack on FPGA RO PUFs and Countermeasures. Proceedings of the Workshop on Embedded Systems Security, WESS '11. 2011;2.1-9.

Merli et al., Side-Channel Analysis of PUFs and Fuzzy Extractors. Trust and Trustworthy Computing. 2011;6740:33-47.

Moradi et al., Pushing the Limits: A Very Compact and a Threshold Implementation of AES. Advances in Cryptology. Eurocrypt 2011. 2011;6632:69-88.

Nabeel et al., Authentication and key management for advanced metering infrastructures utilizing physically unclonable function. IEEE Third International Conference on Smart Grid Communications (SmartGridComm). 2012;324-9. 6 pages.

Nikova et al., Threshold Implementations Against Side-Channel Attacks and Glitches. Information and Communications Security. 2006;4307:529-45. 17 pages.

Owusu et al., OASIS: On Achieving a Sanctuary for Integrity and Secrecy on Untrusted Platforms. Proceedings of the 2013 ACM SIGSAC conference on Computer & communications security. ACM. 2013;13-24. 12 pages.

Paral et al., Reliable and Efficient PUF-based Key Generation using Pattern Matching. IEEE International Symposium on Hardware-Oriented Security and Trust (HOST). 2011;128-33.

Pedersen, A Threshold Cryptosystem without a Trusted Party (Extended Abstract). Advances in Cryptology. Eurocrypt 91. 1991;547:522-6.

Pedersen, Non-Interactive and Information-Theoretic Secure Verifiable Secret Sharing. Advances in Cryptology, Crypto 91. 1992;576:129-40.

Peeters et al., Towards More Secure and Reliable Access Control. Perv Comp. 2011;11(3). 8 pages.

(56) References Cited

OTHER PUBLICATIONS

Peeters, Security Architecture for Things That Think. Department of Electrical Engineering. Arenberg Doctoral School of Science, Engineering and Technology. Dissertation. Jun. 2012. 150 pages.

Pfaffhauser, Protocols for MPC based on Unclonability. Department of Computer Science, ETH Zurich. Master Thesis. Apr. 12, 2011. 53 pages.

Ravikanth, Physical one-way functions. Massachusetts Institute of Technology. Dissertation. Mar. 2001. 154 pages.

Rigaud, ed., D3.1: Report on Protocol choice and implementation. HINT. Project 317930. Aug. 4, 2014. 35 pages.

Ruan et al., Elliptic curve ElGamal Threshold-based Key Management Scheme against Compromise of Distributed RSUs for VANETs. J Info Proc. 2012;20(4). 8 pages.

Rührmair et al., Applications of High-Capacity Crossbar Memories in Cryptography. IEEE Trans Nanotechnol. May 2011;10(3):489-98.

Rührmair et al., Modeling Attacks on Physical Unclonable Functions. Proceedings of the 17th ACM Conference on Computer and Communications Security, CCS '10. 2010;237-49.

Rührmair et al., Power and Timing Side Channels for PUFs and their Efficient Exploitation. IACR Cryptology ePrint Archive 2013;851. 14 pages.

Rührmair et al., PUFs in Security Protocols: Attack Models and Security Evaluations. 2013 IEEE Symposium on Security and Privacy. 2013;286-300.

Sadeghi et al., Short Paper: Lightweight Remote Attestation Using Physical Functions. ACM. Jun. 2011;109-14.

Sardar et al., Zero Knowledge Proof in Secret Sharing Scheme Using Elliptic Curve Cryptography. Global Trends in Computing and Communication Systems. 2012;269:220-6.

Schuster, Side-Channel Analysis of Physical Unclonable Functions (PUFs). Technische Universitat Munchen. Thesis. 2010. 57 pages.

Shamir, How to Share a Secret. Comm ACM. 1979;22(11):612-3.

Shao, Repairing Efficient Threshold Group Signature Scheme. Int J Netw Sec. Sep. 2008;7(2):218-22.

Suh et al., Aegis: A Single-Chip Secure Processor. IEEE Des Test Comp. 2007;570-80.

Suh et al., Physical Unclonable Functions for Device Authentication and Secret key Generation. Proceedings of the 44th annual Design Automation Conference, DAC '07. 2007;9-14.

Tang, ECDKG: A Distributed Key Generation Protocol Based on Elliptic Curve Discrete Logarithm. University of Southern California, Department of Computer Science. Technical Report 04-838. 2004. 20 pages.

Tuyls et al., Read-Proof Hardware from Protective Coatings. Proceedings of the 8th International Conference on Cryptographic Hardware and Embedded Systems. CHES '06. 2006;4249:369-83. 15 pages.

Van Dijk et al., Physical Unclonable Functions in Cryptographic Protocols: Security Proofs and Impossibility Results. Cryptolgoy ePrint Archive. Report 2012/228. Apr. 25, 2012. 36 pages.

Wu et al., On Foundation and Construction of Physical Unclonable Functions. IACR Cryptology ePrint Archive. 2010;171. 18 pages.

Yu et al., Lightweight and Secure PUF Key Storage Using Limits of Machine Learning. Proceedings of the 13th International Conference on Cryptographic Hardware and Embedded Systems, CHES '11. 2011;6917:358-73.

Yu et al., Recombination of Physical Unclonable Functions. GOMACTech. 2010. 4 pages.

Zheng et al., How to Construct Efficient Signcryption Schemes on Elliptic Curves. Inf Proc Lett. 1998;68(5):227-33.

Zheng, Digital Signcryption or How to Achieve Cost(Signature & Encryption) « Cost(Signature) + Cost(Encryption). Advances in Cryptology. Crypto '97. 1997;1294:165-79.

International Search Report and Written Opinion dated Sep. 20, 2018 in connection with International Application No. PCT/US2018/036014.

International Search Report and Written Opinion dated Sep. 20, 2018 in connection with International Application No. PCT/US2018/036023.

Extended European Search Report dated Sep. 6, 2018 in connection with European Application No. 18175600.8.

Chen, Reconfigurable physical unclonable function based on probabilistic switching of RRAM. Electron Lett. Apr. 12, 2015;51(8):615-7.

Wang et al., Verifiable (t, n)Threshold Signature Scheme based on Elliptic Curve. Wuhan Univ J Natural Sci. 2005;10(1):165-8.

Extended European Search Report dated Sep. 28, 2018 in connection with European Application No. EP 16759655.0.

* cited by examiner

Recover

Recover Shares

$$r_i = \sum_{j=1}^{n}\left(\left(\prod_{\substack{j=1\\j\neq i}}^{2t}\frac{-j}{i-j}\right)f_j(i)\right)\mod q$$

PUF-Store-External ($r_i$)

$$r_{2i} = \sum_{j=1}^{n}\left(\left(\prod_{\substack{j=1\\j\neq 2i}}^{2t}\frac{-j}{2i-j}\right)f_j(2i)\right)\mod q$$

PUF-Store-External ($r_{2i}$)

Recover Public Key

$$p^{pub} = r \cdot G = \sum_{j=1}^{n}\sum_{i=1}^{2n}\left(\left(\prod_{\substack{j=1\\j\neq 2i}}^{2t}\frac{-j}{i-j}\right)f_j(i)\cdot G\right)\mod p$$

DEVICE AND SYSTEM WITH GLOBAL TAMPER RESISTANCE

FIELD OF THE DISCLOSURE

This disclosure relates generally to hardware verification, and in particular but not exclusively, to binding authentication to protect against tampering and subversion by substitution.

BACKGROUND

A desirable characteristic of PUF-enabled systems is tamper resistance: modifying hardware changes the unique physical characteristics that influence the PUF input-output mapping. If a device's identity is based on the PUF, then modifications to the device's hardware will also result in modifications to the device's digital identity.

SUMMARY OF THE DISCLOSURE

Various approaches have been presented to prevent the extraction of shares that compose a device's local identity based on hardware intrinsic properties. Approaches also exist for constructing an identity for a set of two or more devices by allocating each device shares of the joint identity. It is realized that such constructions do not prevent an adversary from systematically extracting the share of the joint identity from each device after the shares are generated. Thus, the local tamper resistance can be improved to extend to tamper resistance of the larger system composed of two or more devices.

According to an embodiment of an authentication system, multiple PUF-enabled devices or components are able to jointly perform cryptographic operations. Some embodiments may be implemented such that the cryptographic operation will be computed successfully so long as no adversarial tampering occurs on more than a threshold number of the devices. In one example, each PUF-enabled device or component is equipped with at least two shares of a threshold cryptosystem, and at least t devices must each use at least two of their shares in order to successfully compute the cryptographic operation. This construction can be employed to mitigate adversarial tampering attacks, which attempt to extract shares from a device in the authentication system.

According to one aspect, an authentication system including a plurality of components for jointly executing cryptographic operations based on a shared global identity is provided. The system comprises at least a first component and a second component having respective hardware intrinsic identity circuits configured to generate hardware specific outputs responsive to input challenges, and at least one processor configured to: combine outputs of threshold operations on a plurality of shares associated with a first component identity and map to at least a first and a second share of a global identity comprising a public encryption key and associated secret, combine outputs of threshold operations on a plurality of shares associated with a second component identity and map to at least a third and a fourth share of the global identity, and enable execution of a cryptographic operation based on shares of the global identity, the global identity comprising the public encryption key and associated secret.

According to one embodiment, at least the first and second components comprise discrete or separate systems that collaborate to enable the cryptographic operation based on the global identity. According to one embodiment, the hardware intrinsic identity circuit comprises a physically unclonable function circuit (a "PUF"). In other embodiments, other circuits can be used that exhibit properties of PUFs. For example, a circuit having a physically unclonable property can be used. In another example, a circuit having tamper resistance can be used. In various embodiments, the properties of unclonability and tamper resistance are provided to increase security and resistance to attack. According to one embodiment, the system components can be discrete or separate systems that collaborate to use global identity for cryptographic operations (e.g., digital signature, encryption, decryption, component validation, etc.). According to another embodiment, the system components can be components of a discrete system, and the components internal to the discrete system can collaborate to use the global identity as a whole system identity for cryptographic operations.

According to one embodiment, the at least one processor is configured to combine the outputs of threshold operations on a plurality of shares associated with a first component identity and map to at least a first and a second share of a global identity based on the outputs of the threshold operations on the plurality of shares associated with the first component identity. In further embodiments, mapping to the first and second share of the global identity can include further threshold operations or obscured operations to limit the presence of the shares in memory. In other embodiments, mapping to the first and second share of the global identity can include recovering the actual shares.

According to one embodiment, the at least one processor is configured to map challenges and respective helper values to the plurality of shares of a secret associated with the first component identity. According to one embodiment, the first component identity comprises a public key and a secret associated with the first component.

According to one embodiment, the at least one processor is configured to map challenges and respective helper values to shares of the plurality of shares of the second component identity. According to one embodiment, the second component identity comprises a public key and secret associated with the second component.

According to one embodiment, only one share of an associated identity is in memory at a time. According to one embodiment, shares corresponding to an identity are used or recovered one at a time to prevent capture of multiple shares by an adversary. Threshold operations can be executed on the individual shares and combined with threshold operations on later used or recovered shares to enable the operations on the secret without actually constructing the secret in memory or having the underlying shares associated with the secret in memory at any given time period. According to one embodiment, the first component includes a first hardware intrinsic identity circuit, a first processor, and a first communication interface.

According to one embodiment, the second component includes a second hardware intrinsic identity circuit, a second processor, and a second communication interface. According to one embodiment, the at least one processor is configured to enroll at least the first component and the second component into the global identity, and encode respective shares of the global identity based on respective identities of the first and the second component. According to one embodiment, the at least one processor is configured to define, during enrollment, a threshold sharing of the global identity between at least the first component and the second component that requires a minimum of two shares from a minimum of two devices to enable cryptographic operations based on the threshold sharing of the global identity.

According to one embodiment, the at least one processor during enrollment defines a threshold sharing of the global identity that requires a minimum of two shares from one component to enable cryptographic operations with the associated secret of the threshold sharing of the global identity. According to one embodiment, the system further comprises a memory connected to the at least one processor, wherein the at least one processor is configured to store challenge values and corresponding helper values in the memory. According to one embodiment, the respective hardware intrinsic identity circuits include a physically unclonable function circuit (PUF).

According to one aspect, a computer implemented method for jointly executing cryptographic operations based on a global identity is provided. The method comprises generating at least a first and a second hardware intrinsic identity circuit respective hardware specific outputs responsive to input challenges, combining, by at least one processor, outputs of threshold operations on a plurality of shares associated with a first component identity, mapping, by the at least one processor, challenges to at least a first and a second share of a global identity comprising a public encryption key and associated secret, combining, by the at least one processor, outputs of threshold operations on a plurality of shares associated with a second component identity, mapping, by the at least one processor, challenges to at least a third and a fourth share of the global identity, and enabling execution of a cryptographic operation associated with the global identity, the global identity comprising the public encryption key and associated secret.

According to one embodiment, the method further comprises mapping by the at least one processor challenges and respective helper values to the plurality of shares of the first component identity. According to one embodiment, the first component identity comprises a public key and secret associated with the first component. According to one embodiment, the method further comprises mapping by the at least one processor challenges and respective helper values to shares of the plurality of shares of the second component identity. According to one embodiment, the second component identity comprises a public key and secret associated with the second component.

According to one embodiment, wherein only one share of an associated identity is in memory at a time. According to one embodiment, the first component includes a first hardware intrinsic identity circuit, a first processor, and a first communication interface, and act of combining, by at least one processor, outputs of threshold operations on a plurality of shares associated with a first component identity is executed on the first processor of the first component. According to one embodiment, the second component includes a second hardware intrinsic identity circuit, a second processor, and a second communication interface, and the act of combining, by the at least one processor, outputs of threshold operations on plurality of shares associated with a second component identity is executed on the second processor of the second component.

According to one embodiment, the method further comprises enrolling, by the at least one processor, at least the first component and the second component into the global identity; and encoding, by the at least one processor, respective shares of the global identity based on respective identities of the first and the second component. According to one embodiment, the act of enrolling includes defining, by the at least one processor, a threshold sharing of the global identity between at least the first component and the second component to require a minimum of two shares from a minimum of two devices to enable cryptographic operations based on the associated secret of the threshold sharing of the global identity. According to one embodiment, the act of enrolling includes defining, by the at least one processor, a threshold sharing of the global identity to require a minimum of two shares from one component to enable cryptographic operations based on the associated secret of the threshold sharing of the global identity.

According to one embodiment, the method further comprises accessing from a memory connected to the at least one processor, stored challenge values and corresponding helper values in the memory; and communicating the challenge values to respective hardware intrinsic identity circuits. According to one embodiment, the hardware intrinsic identity circuit includes a physically unclonable function circuit (PUF).

According to one aspect, an authentication device including a plurality of components for jointly executing cryptographic operations based on a global identity is provided. The system comprises a plurality of components having hardware intrinsic identity circuits configured to generate respective hardware specific outputs responsive to input challenges, and at least one processor configured to: combine outputs of threshold operations on a plurality of shares associated with respective ones of the plurality of components and map to at least two respective shares of a global identity from at least two respective ones of the plurality of components, and enable execution of a cryptographic operation associated with the global identity, wherein the global identity comprises a public encryption key and associated secret.

According to one embodiment, the at least one processor defines is configured to define a threshold sharing of the global identity between the plurality of components that requires a minimum of two shares from a minimum of two devices to enable cryptographic operations based on the threshold sharing of the global identity.

According to one aspect, at least one non-transitory storage medium storing processor-executable instructions that, when executed, perform a method is provided. The method comprises generating using at least a first and a second hardware intrinsic identity circuit respective hardware specific outputs responsive to input challenges, combining outputs of threshold operations on a plurality of shares associated with a first component identity, recovering at least a first and a second share of a global identity, combining outputs of threshold operations on plurality of shares associated with a second component identity, recovering at least a third and a fourth share of the global identity, and enabling execution of a cryptographic operation associated with the global identity, wherein the global identity comprises a public encryption key and associated secret.

According to various embodiments of the at least one non-transitory medium, the method executed by the processor-executable instructions includes executing any of the preceding method steps.

According to one aspect, least one non-transitory storage medium storing processor-executable instructions that, when executed, perform a method is provided. The method comprises generating using a plurality of components having hardware intrinsic identity circuits respective hardware specific outputs responsive to input challenges, combining outputs of threshold operations on a plurality of shares associated with respective ones of the plurality of components recovering at least two shares of a global identity from at least two of the plurality of components, and enabling execution of a cryptographic operation associated with the global identity based on the at least two shares from the at least two of the plurality of system components, wherein the global identity comprises a public encryption key and associated secret.

According to various embodiments of the at least one non-transitory medium, the method executed by the processor-executable instructions includes executing any of the preceding method steps.

DETAILED DESCRIPTION

According to one aspect, to securely store shares of the joint system identity, a PUF-enabled device or system component uses hybrid encryption to store sensitive values. Algorithm 1 provides an example of a hybrid encryption approach. According to some embodiments, various devices can employ already established local identities. For example, each device can have a local identity based on hardware intrinsic properties of the device. U.S. application publication number 2017/0063559 (incorporated herein by reference in its entirety) describes examples of encoding a hardware intrinsic identity and may be used to generate a local identity for respective devices or components to support a tamper resistant global identity as discussed herein.

---
Algorithm 1 PUF-Store-External
---
Goal: Store external value $V_i$
for PUF Device $p_i$ do
    Sample symmetric key k uniformly and randomly from $2^\lambda$
    (where $\lambda$ is the security parameter of a symmetric cipher)
    Write $E_k(V_i)$ to non-volatile memory
    (where E is a symmetric cipher)
    Write $E(p_i^{pub}, k)$ to non-volatile memory
    (where E is an asymmetric cipher using public key $p_i^{pub}$ to encrypt value k)
end for
---

In Algorithm 1, a device begins storing a value $V_i$ by encrypting it with a symmetric encryption algorithm $E(\cdot)$ and a uniformly and randomly generated symmetric encryption key k. The security parameter of the symmetric encryption algorithm (number of bits in the key) is denoted $\lambda$, and thus the key is sampled from the space $2^\lambda$. $E_k(V_i)$ denotes the symmetric encryption of $V_1$ with key k, which is written to the device's memory.

Next, the device's public identity (e.g., asymmetric public identity key $p_i^{pub}$ (with corresponding private key $p_i^{priv}$ linked to the device's PUF)) is used to encrypt (e.g., asymmetrically) the encryption key k. This is denoted $E(p_i^{pub}, k)$, where $E(\cdot, \cdot)$ is an asymmetric encryption algorithm using public key $p_i^{pub}$ to encrypt value k.

When the value $V_i$ is to be recovered by the device, the process is reversed. This is summarized in Algorithm 2.

---
Algorithm 2 PUF-Retrieve-External
---
Goal: Retrieve external value $V_i$
for PUF Device d do
    Read $E(p_i^{pub}, k)$ from non-volatile memory
    $k \leftarrow (\mathcal{O} = \text{decrypt}, E(p_i^{pub}, k))$
    $V_i \leftarrow D_k(E_k(V_i))$
end for
---

First, the symmetric key k is recovered by performing asymmetric decryption as $(\mathcal{O}=\text{decrypt}, E(p_i^{pub}, k))$ using Algorithm 3. Then, symmetric decryption is performed using k as $D_k(E_k(V_i))$ to recover the value $V_i$.

---
Algorithm 3 Internal-PUF-Threshold-OP-Staggered
---
Goal: Perform threshold operation$\mathcal{O}$ at time $\tau$
One-Time Setup Stage
for each Threshold Share $r_i$ do
    Run Algorithm 11: Enrollment, Publicize $p_i^{pub}$
end for
Run (2, 2)-PUF-DKG Protocol, Publicize $\mathcal{P}^{pub}$
Evaluation Stage
for each Threshold Share $r_i$ do
    PUF-Share-Update-Preparation
end for
for each Threshold Share $r_i$ do
    Recover share $r_i^{(\tau)} \leftarrow$ PUF-Retrieve($c_i^{(\tau)}$, helper$_i^{(\tau)}$)
    $p_i^{(\mathcal{O})} \leftarrow \mathcal{O}(r_i^{(\tau)})$, Local threshold operation
    Update share
        $r_i^{(\tau+1)} \leftarrow$ PUF-Share-Update-Application($r_i^{(\tau)}$)
    Store $r_i^{(\tau+1)}$ and update PUF challenge:
        $\{c_i^{(\tau+1)}, \text{helper}_i^{(\tau+1)}\} \leftarrow$ PUF-Store($r_i^{(\tau+1)}$)
end for
return$\mathcal{O} \leftarrow$ Combine($\{p_0^{(\mathcal{O})}, p_1^{(\mathcal{O})}\}$)
---

Algorithms 1 and 2 will be used to securely store and retrieve a device's shares of a joint identity representing a set of two or more devices. Algorithm 12 describes how this set of devices generates a joint public identity $\mathcal{P}^{pub}$ and allocates each of two (or more) shares $\{r_i, r_{2i}\}$ of the joint identity to each device $p_i$.

Figure 1:
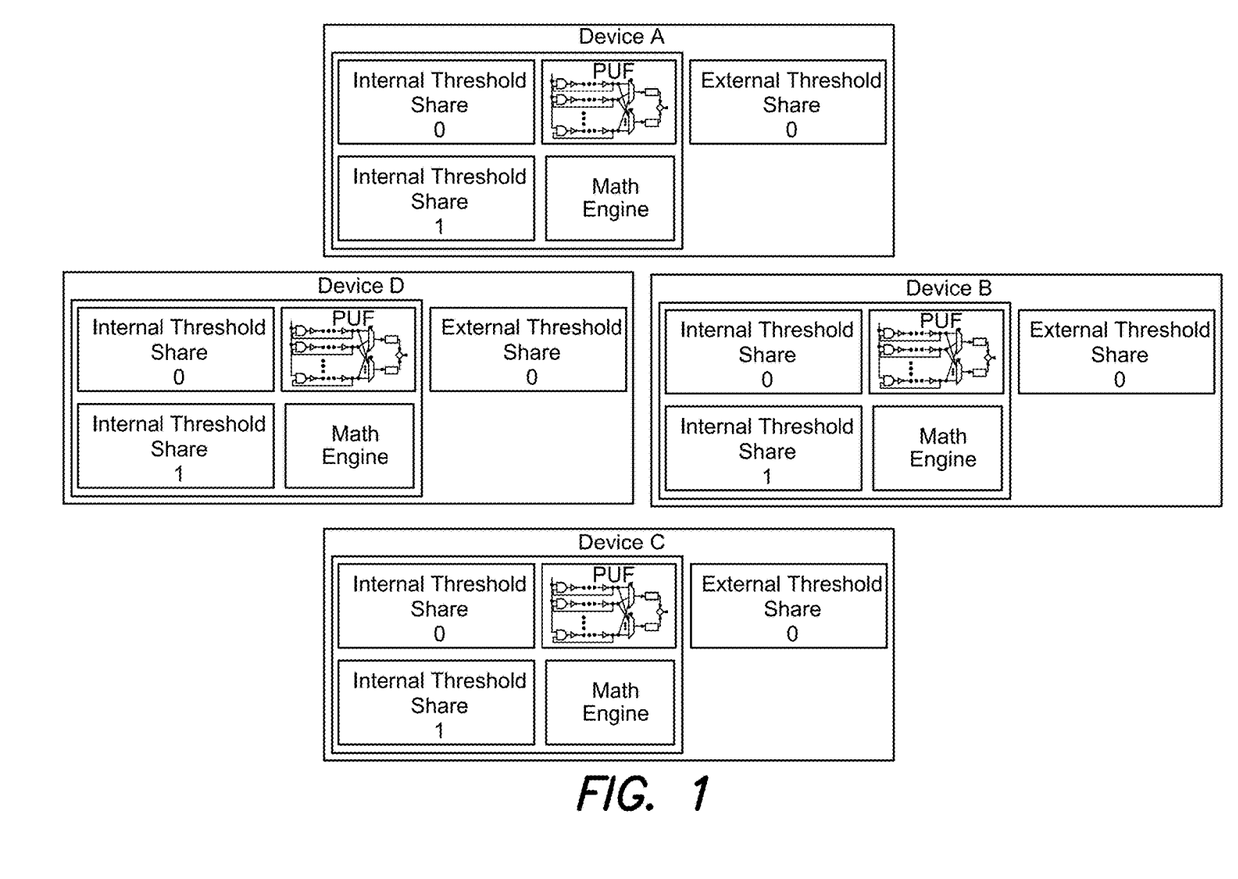
FIG. 1 is a functional diagram of a system where each device has one external threshold share.

FIG. 1 illustrates a set of devices that have been allocated only a single share of the joint public identity $\mathcal{P}^{pub}$. In this configuration, an adversary may wait until the device recovers its share of the joint identity, and then probe the device to extract the share. Although the device will never be able to recover the share in the future, the adversary may now masquerade as the device to this external system. An adversary can masquerade as the entire group by iteratively extracting the share from each device after each device recovers its share until t shares are recovered.

Figure 2:
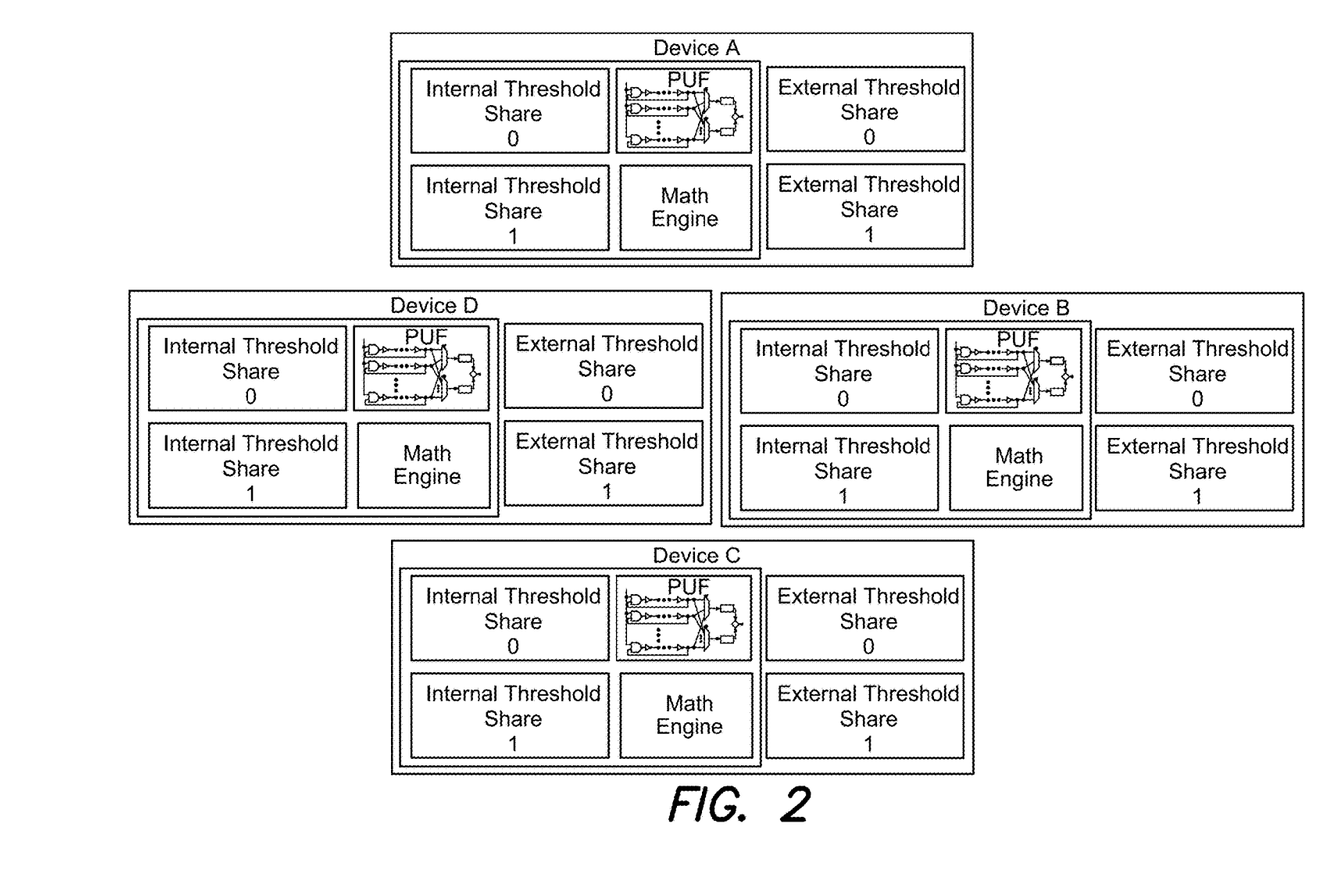
FIG. 2 is a functional diagram of a system where each device has two or more external threshold shares.
Figure 3A:
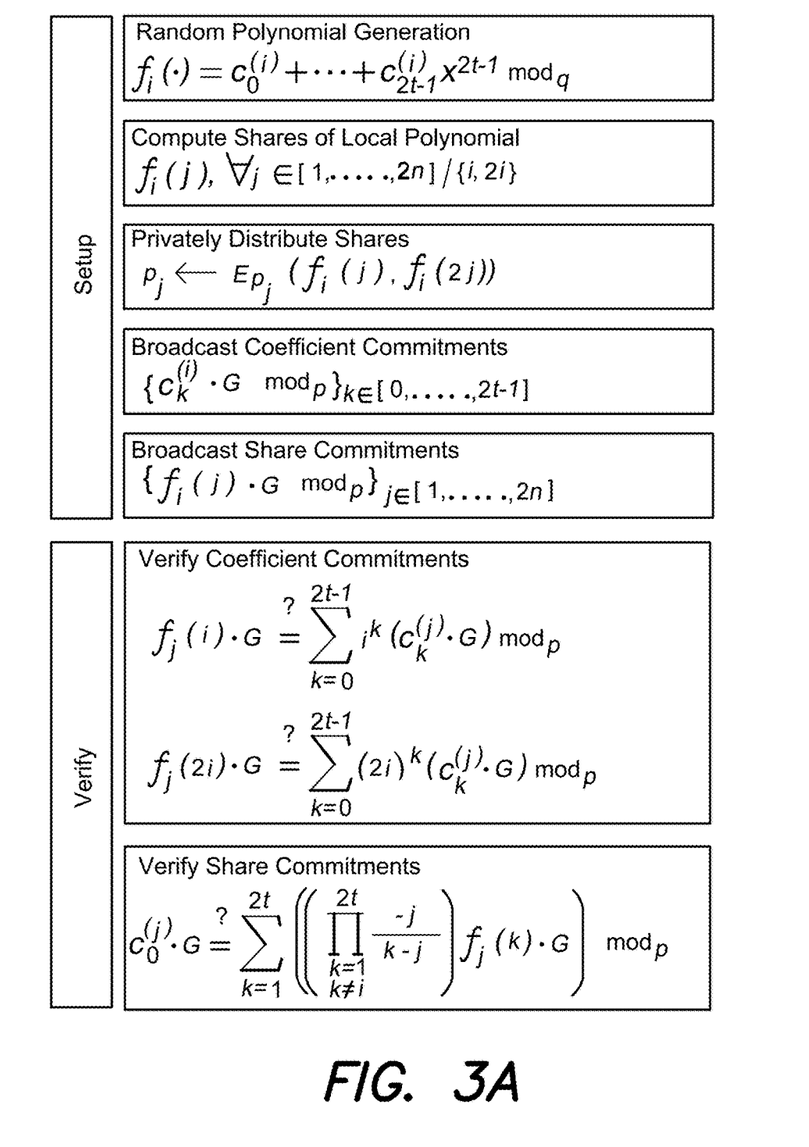
FIGS. 3A and 3B are a flow chart of global PUF distributed key generation.
Figure 3B:
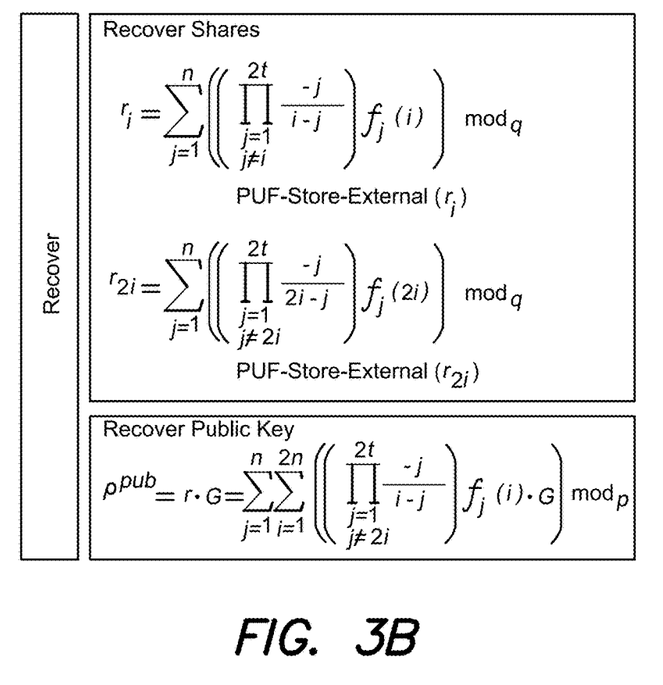

FIG. 2 illustrates a set of devices that have been allocated two (or more) shares of the joint public identity $\mathcal{P}^{pub}$. In this configuration, an adversary may wait until the device recovers one of its shares, and then probe the device to extract the share. However, neither the adversary nor the device will be able to recover the device's remaining shares, as the PUF mapping will have been altered by the act of tampering. Thus, by allocating two (or more) shares to each device and setting the threshold to 2t (rather than t), the external system and its global identity retains the same degree of tamper detection as each individual device.

According to some embodiments, various circuit constructions can be employed that provide challenge response functionality. In some examples, a hardware intrinsic identity circuit provides for a hardware based identity, which can include PUFs. In other examples, the hardware intrinsic identity circuit can provide tamper resistance and/or unclonability properties to improve the security of the system.

In one embodiment of the present invention, the shares of the joint external identity may be refreshed. Algorithm 5 describes how each device $p_i$ prepares to update their shares of the joint external identity $\mathcal{P}^{pub}$.

---

Algorithm 4 PUF-DKG-Global

---

Goal: Generate global shares of master private key $\mathcal{P}^{priv}$
for $1 \leq i \leq n$ do
   Select random polynomial $f_i(\cdot) = c_0^{(i)} + \ldots + c_{2t-1}^{(i)} x^{2t-1} \mod q$
   Compute $f_i(j), \forall j \in [1, \ldots, 2n]/\{i, 2i\}$
   Privately send $f_i(j), f_i(2j)$ to participant $p_j, \forall j \in [1, \ldots, n]/i$
   Broadcast coefficient commitments $\{c_k^{(i)} \cdot G \mod p\}_{k \in [0, \ldots, 2t-1]}$
   Broadcast share commitments $\{f_i(j) \cdot G \mod p\}_{j \in [1, \ldots, 2n]}$
for $1 \leq i \leq n$ do
   Verify $$f_j(i) \cdot G \stackrel{?}{=} \sum_{k=0}^{2t-1} i^k \left(c_k^{(j)} \cdot G\right) \mod p$$

Verify $$f_j(2i) \cdot G \stackrel{?}{=} \sum_{k=0}^{2t-1} (2i)^k \left(c_k^{(j)} \cdot G\right) \mod p$$

Verify $$c_0^{(j)} \cdot G \stackrel{?}{=} \sum_{k=1}^{2t} \left(\left(\prod_{\substack{k=1 \\ k \neq j}}^{2t} \frac{-j}{k-j}\right) f_j(k) \cdot G\right) \mod p$$

end for
Recover shares $$r_i = \sum_{j=1}^{n} \left(\left(\prod_{\substack{j=1 \\ j \neq i}}^{2t} \frac{-j}{i-j}\right) f_j(i)\right) \mod q$$

PUF-Store-External($r_i$)

$$r_{2i} = \sum_{j=1}^{n} \left(\left(\prod_{\substack{j=1 \\ j \neq 2i}}^{2t} \frac{-j}{2i-j}\right) f_j(2i)\right) \mod q$$

PUF-Store-External($r_{2i}$)

Recover public key $$\mathcal{P}^{pub} = r \cdot G = \sum_{j=1}^{n} \sum_{i=1}^{2n} \left(\left(\prod_{\substack{j=1 \\ j \neq i}}^{2t} \frac{-j}{i-j}\right) f_j(i) \cdot G\right) \mod p$$

end for

---

Algorithm 5 External-Share-Update-Preparation

---

Goal: Prepare update to construct external share $r_i^{(\tau+1)}$
for all Participants $p_i \in \mathcal{P}$ do
   Select random polynomial of degree $(2t - 1)$ such that $\delta_i(0) = 0$:
      $\delta_i(\cdot) = \Delta_1^{(i)} x + \cdots + \Delta_m^{(i)} x^{2t-1}$
   Compute
      $\{\epsilon_{im} = \Delta_m^{(i)} \cdot G\}_{m \in [1 \ldots 2t-1]}$
      $\{u_{ij} = \delta_i(j)\}_{j \in [1 \ldots 2n]}$
      $\{e_{ij} = ENC_j(u_{i(j)}, u_{i(2j)})\}_{j \in [1 \ldots n]}$

---

Algorithm 5 External-Share-Update-Preparation

---

Broadcast
      $VSS_i^{(\tau)} = \langle i, \tau, \{\epsilon_{im}\}, \{e_{ij}\} \rangle$,
      $SIG_i(VSS_i^{(\tau)})$
end for

---

Next, each participant verifies the update information received from other participants and applies the update to its shares as set forth in Algorithm 6.

---

Algorithm 6 External-Share-Update-Application

---

Goal: Apply external share update to construct $\{r_i^{(\tau+1)}, r_{2i}^{(\tau+1)}\}$
for all Participants $p_i \in \mathcal{P}$ do
   Recover share $r_i^{(\tau)}$
      $r_i^{(\tau)} \leftarrow$ PUF-Retrieve-External $(E(p_i^{pub}, k), E_k(r_i))$
   Verify $\forall j \neq i$ $$DEC_i(ENC_i(u_{ji})) \cdot G \stackrel{?}{=} \sum_{\ell=1}^{t} i^\ell \epsilon_{j\ell}$$

Update share as:

$$r_i^{(\tau+1)} \leftarrow r_i^{(\tau)} + \left(\sum_{j=1}^{2n} u_{ji} \mod q\right)$$

Recover share $r_{2i}^{(\tau)}$
      $r_{2i}^{(\tau)} \leftarrow$ PUF-Retrieve-External $(E(p_i^{pub}, k), E_k(r_{2i}))$
   Verify $\forall j \neq 2i$ $$DEC_i(ENC_i(u_{j(2i)})) \cdot G \stackrel{?}{=} \sum_{\ell=1}^{t} (2i)^\ell \epsilon_{j\ell}$$

Update share as:

$$r_{2i}^{(\tau+1)} \leftarrow r_{2i}^{(\tau)} + \left(\sum_{j=1}^{2n} u_{j(2i)} \mod q\right)$$

end for

---

The dynamic nature of shares in this construct also permits an embodiment in which the number of participants n participating in a group can be varied dynamically so that participants may join or leave the set of participants in the (t, n) threshold system. In this case, up to n–t participants can be removed from the set $\mathcal{P}$ simply by leaving them out of the next share refresh protocol. To add a participant $p_j$ to the set of participants, each current participant $p_i$ generates an extra share $u_{ij}$ from their share update polynomial $\delta_i(\cdot)$.

To add a new participant $p_{new}$ with ID new to the set of participants, their share f(new) must be generated by t members with existing shares. This is performed by each of the t members contributing their share interpolated for $p_{new}$, and blinding these sub-shares with a sharing of zero distributed among the t members. The blinding by a sharing of zero prevents recovery of the t shares $r_i$ from the sub-shares. That is, as the t participants are known, distributing a sub-share as $$\left(r_i \cdot \left(\prod_{\substack{j=1 \\ j \neq i}}^{t} \frac{new - j}{i - j}\right)\right) \mod q$$

allows the participant $p_{new}$ to remove the Lagrangian interpolation term $$\left(\prod_{\substack{j=1\\j\neq i}}^{t} \frac{new-j}{i-j}\right)$$

and recover $p_i$'s share $r_i$, as the t members that contribute sub-shares are known to $p_{new}$. To prevent $p_{new}$ from recovering an existing share $r_i$ from the sub-share, each sub-share is blinded using separate shares of a sharing of 0 among the t members. Algorithm 7 describes how shares of 0 are generated and distributed to the other existing t members.

---
Algorithm 7 Share-Blinding
---

Goal: Prepare a sharing of 0
for all Participants $p_i \in \mathcal{P}$ do
    Select random polynomial of degree (t − 1) such that $\delta_i(0) = 0$:
        $\delta_i(\bullet) = \Delta_1^{(i)}x + \cdots + \Delta_m^{(i)}x^{t-1}$
    Compute
        $\{\epsilon_{im} = \Delta_m^{(i)} \cdot G\}_{m \in [1...t-1]}$
        $\{u_{ij} = \delta_i(j)\}_{j \in [1...t]}$
        $\{e_{ij} = ENC_j(u_{ij})\}_{j \in [1...t]}$
    Broadcast
        $VSS_i^{(\tau)} = \langle i, \tau, \{\epsilon_{im}\}, \{e_{ij}\}\rangle$
        $SIG_i(VSS_i^{(\tau)})$
end for

---

First, each participant $p_i \in \mathcal{P}$, $|\mathcal{P}| \geq t$ generates a polynomial $\delta_i(\cdot)$ where the free coefficient $\Delta_0^{(i)}=0$, and consequently $\delta_i(0)=0$. Each participant then distributes shares of their polynomial $\delta_i(j)$ to the other players $p_{j,j\neq i} \in \mathcal{P}$ to complete a verifiable sharing of 0. Thus, these shares can be used to blind another sharing without changing the secret being shared.

Upon receiving the sharing of 0, each participant will verify the shares and use them to blind their sub-shares for new participant $p_{new}$. Algorithm 41 describes how the sharing of 0 is verified, the local sub-share of $p_{new}$'s share is constructed, and how it is blinded before being distributed to $p_{new}$.

---
Algorithm 8 Share-Construction
---

Goal: Enable new participant $p_{new}$ to construct a new share $r_{new}$
for all Participants $p_i \in \mathcal{P}$ do
    Recover share $r_i^{(\tau)}$
        $r_i^{(\tau)} \leftarrow$ PUF-Retrieve($c_i^{(\tau)}$, helper$_i^{(\tau)}$)
    Verify $\forall j \neq i$ $$DEC_i(ENC_i(u_{ji})) \cdot G \stackrel{?}{=} \sum_{k=1}^{t} j^k \epsilon_{jk}$$

Construct sub-share $r_{new}^i$ for $p_{new}$ $$r_{new}^i \leftarrow \left(r_i^{(t)} \cdot \left(\prod_{\substack{j=1\\j\neq i}}^{t} \frac{new-j}{i-j}\right)\right) \mod q$$

Blind sub-share with sharing of 0 from Algorithm 7: Share-Blinding $$r_{new}^i \leftarrow r_{new}^i + \sum_{i=1}^{t}\left(u_{ji} \cdot \left(\prod_{\substack{j=1\\j\neq i}}^{t} \frac{-j}{i-j}\right)\right) \mod q$$

---
Algorithm 8 Share-Construction
---

$p_{new} \leftarrow ENC_{pnew}(r_{new}^i)$
    Update share
        $r_i^{(\tau+1)} \leftarrow$ PUF-Share-Update-Application($r_i^{(\tau)}$)
    Store $r_i^{(\tau+1)}$ and update PUF challenge:
        $\{c_i^{(\tau+1)}, helper_i^{(\tau+1)}\} \leftarrow$ PUF-Store(PUF$_i$, $r_i^{(\tau+1)}$)
end for

---

First, each of the t participants $p_i \in \mathcal{P}$ begins by recovering their share $r_i^{(\tau)}$ and verifying

--- for New Participant $p_{new}$ do
    for all $i \in \mathcal{P}$ do
        $r_{new}^i \leftarrow DEC_{pnew}(ENC_{pnew}(r_{new}^i))$
    end for
    $r_{new}^{(\tau)} = \Sigma_{i-1}^t r_{new}^i \mod q$
    $r_{new}^{(\tau+1)} \leftarrow$ PUF-Share-Update-Application($r_{new}^{(\tau)}$)
    $\{c_{new}^{(\tau+1)}, helper_{new}^{(\tau+1)}\} \leftarrow$ PUF-Store(PU $F_{new}$, $r_{new}^{(\tau+1)}$)
end for

--- the sharing of 0 they received from Algorithm 7. The sub-share $r_{new}^i$ generated by participant $p_i$ is then constructed by performing their portion of Lagrangian interpolation for f(new), where new is the ID of the new participant. This sub-share is subsequently blinded using the sharing of 0 to prevent the new participant $p_{new}$ from recovering the share $r_i$ of participant $p_i$ by removing the Lagrangian interpolation term. After sending their sub-share to $p_{new}$, participant $p_i$ updates their share to the new time period ($\tau$+1) and stores this value using a PUF. All of the received sub-shares are combined by the new participant $p_{new}$ to form their share $r_{new}^{(\tau)}$, which is finally updated for time period ($\tau$+1) and stored using a PUF.

In other embodiments, the players may perform the operations of Algorithm 41 in a different order. For example, first each of the t participants $p_i \in \mathcal{P}$ recover their share $r_i^{(\tau)}$ and verify the sharing of 0 they received from Algorithm 7. Then $p_i$ updates their share to the new time period ($\tau$+1), which is subsequently used to generate the replacement sub-share $r_{new}^i$ by performing their portion of Lagrangian interpolation for f(new), where new is the ID of the new participant. Participant $p_i$ stores their updated share $r_i^{(\tau+1)}$ using the PUF, and sends the sub-share $r_{new}^{(\tau+1)}$ to $p_{new}$. All of the received sub-shares are combined by the new participant $p_{new}$ to form their share $r_{new}^{(\tau+1)}$, which is then stored using a PUF.

Algorithm 13 illustrates an example of a subset of component devices $\overline{D} \subseteq D, |\overline{D}|=m \leq n$ constructing a joint threshold proof for the verifier V. Although in this example the verifier combines partial proofs (thus, implying O(n) work for V as the number of partial proofs is 2n), a secretary could instead combine the partial shares and forward the result to the verifier. As another alternative, the components could form a ring, and pass their partial shares to the next component, which combines their own partial proof before forwarding on to the next component. First, we review the Enrollment Algorithm, Distributed Key Generation Algorithm, and PUF-Retrieve Algorithms.

Algorithms 9 and 10 below can be used to allow a PUF-enabled device to locally store and retrieve a sensitive value without storing any sensitive information in non-volatile memory. Algorithm 9 illustrates the storing of a sensitive value $V_i$ using a PUF, and Algorithm 10 illustrates the dynamic regeneration of $V_i$. The challenge $c_i$ and helper data helper, can be public, as neither reveals anything about the sensitive value $V_i$. While the present example uses encryption of $V_i$ by exclusive-or, $\oplus$, $V_i$ could also be used as a key to other encryption algorithms (e.g., AES) to enable storage and retrieval of arbitrarily sized values.

---
Algorithm 9 PUF-Store
---

Goal: Store value $V_i$
for PUF Device d do
    Select finite field $\mathbb{F}_n$ of order n
    Select E, an elliptic curve over $\mathbb{F}_n$
    Find $G \in E/\mathbb{F}_n$, a group generator
    Select challenge $c_i \in \mathbb{F}_n$
    $x = H(c_i, E, G, n)$
    $O = PUF(x)$
    $helper_i = P_i = O \oplus ECC(V_i)$
    Write $\{c_i, helper_i\}$ to non-volatile memory
end for ---
Algorithm 10 PUF-Retrieve
---

Goal: Retrieve value $V_i$
for PUF Device d do
    Read $\{c_i, helper_i\}$ from non-volatile memory
    $x \leftarrow H(c_i, E, G, n)$
    $O' = PUF(x)$
    $V_i \leftarrow D((ECC(V_i) \oplus O) \oplus O')$
end for Whenever O and O' are t-close, the error correcting code ECC can be passed to a decoding algorithm D which will recover the sensitive value $V_i$.

Using Algorithm 11, a local device can perform an enrollment protocol using the PUF. This allows each PUF circuit to generate a local public key $p_i^{pub}$, which is useful for bootstrapping more complex key setup algorithms (e.g., the distributed key generation protocol in Algorithm 12). When the key setup algorithm is performed internal to the device (rather than externally among a set of distinct devices), this bootstrap process may not be necessary.

---
Algorithm 11 Enrollment
--- for Device d do
    $c_i \in \mathbb{F}_p$, a group element
    $x = H(c_i, E, G, p, q)$
    $O = PUF(x)$
    $helper_i = O \oplus ECC(p_i^{priv} \bmod q)$
    $p_i^{pub} = A_i = p_i^{priv} \cdot G \bmod p$
    Store $\{p_i^{pub}, c_i, helper_i\}$
end for In accordance with the invention, PUF-based cryptographic primitives are adapted to secret sharing to permit threshold cryptography founded on PUF or other root of trust. Using the example of an embodiment employing elliptic curve cryptography, distributed key generation is used to generate a number of shares (for example, two: $r_1$, $r_2$) of a master private key $\mathcal{P}^{priv} = (r_1 + r_2) \bmod q$, which itself is never generated or constructed. (It is also possible to work directly with a message (e.g., as described by Ertaul) rather than a private key). The protocol is summarized in Algorithm 12: PUF-DKG, where an exemplary implementation would choose (t, n) as (2, 2).

---
Algorithm 12 PUF-DKG
---

Goal: Generate shares of master private key $\mathcal{P}^{priv}$
for $1 \leq i \leq n$ do
    Select random polynomial $f_i(\cdot) = c_0^{(i)} + \ldots + c_{t-1}^{(i)} x^{t-1} \bmod q$
    Compute $f_i(j), \forall j \in [1, \ldots, n]/i$
    Store coefficient commitments $\{c_k^{(i)} \cdot G \bmod p\}_{k \in [0, \ldots, t-1]}$
    Store share commitments $\{f_i(j) \cdot G \bmod p\}_{j \in [0, \ldots, n]}$
for $1 \leq i \leq n$ do
    Verify $$f_j(i) \cdot G \stackrel{?}{=} \sum_{k=0}^{t-1} j^k \left(c_k^{(j)} \cdot G\right) \bmod p$$

Verify $$c_0^{(j)} \cdot G \stackrel{?}{=} \sum_{i=1}^{t} \left(\left(\prod_{\substack{j=1 \\ j \neq i}}^{t} \frac{-j}{i-j}\right) f_i(j) \cdot G\right) \bmod p$$

end for
Recover shares $$r_i = \sum_{j=1}^{n} \left(\left(\prod_{\substack{j=1 \\ j \neq i}}^{t} \frac{-j}{i-j}\right) f_j(i)\right) \bmod q$$

Recover Public key $$\mathcal{P}^{pub} = r \cdot G = \sum_{j=1}^{n} \sum_{i=1}^{n} \left(\left(\prod_{\substack{j=1 \\ j \neq i}}^{t} \frac{-j}{i-j}\right) f_j(i)\right) \cdot G \bmod p$$

end for

---
Algorithm 13 Interactive Threshold Proof Construction
---

Goal: Perform threshold zero knowledge proof at $\tau$
One-Time Setup Stage
for each System Device $d_i \in \mathcal{D}$ do
    Run Enrollment Algorithm
    Run Distributed Key Generation Algorithm
end for
Evaluation Stage
for Verifier $\mathcal{V}$ do
    Broadcast ephemeral nonce N to all $d_1 \in \mathcal{D}$
end for
for all Participants $p_i \in \mathcal{P}$ do
    for Share index $\ell \in \{i, 2i\}$ do
        Choose a random $y_\ell \in \mathbb{F}_q$
        Compute and broadcast $B_\ell = y_\ell \cdot G \bmod p$ to all $d_i \in \mathcal{D}$
    end for
    for Share index $\ell \in \{i, 2i\}$ do
        Recover share $r_\ell \leftarrow$ PUF-Retrieve-External($E(p_i^{pub}, k), E_k(r_\ell)$)
        Compute $$B = y \cdot G = \sum_{i=1}^{2t} B_i \bmod p$$

$$e = \text{Hash}(G, B, \mathcal{P}^{pub}, N)$$

$$M_\ell = y_\ell + r_\ell e \left(\prod_{\substack{j=1 \\ j \neq \ell}}^{2t} \frac{-j}{\ell - j}\right) \bmod q$$

-continued

---
Algorithm 13 Interactive Threshold Proof Construction
---

Send ($B_i$, $M_i$, $B_{2i}$, $M_{2i}$) to verifier $\mathcal{V}$
  end for
 end for

---

Similarly, Algorithm 13 can be performed non-interactively. This is accomplished by replacing the verifier's nonce N with a timestamp $\tau$ generated by the components, as illustrated in Algorithm 14. The timestamp serves as a replacement for the server's randomness N, and prevents replay attacks by adding a temporal requirement to the proof. That is, the timestamp is monotonically increasing, and the verifier simply checks that the timestamp used in the proof is reasonably (e.g., second granularity) current.

---
Algorithm 14 Non-Interactive Threshold Proof Construction
---

Goal: Perform threshold zero knowledge proof at $\tau$
<u>One-Time Setup Stage</u>
for each System Device $d_i \in \mathcal{D}$ do
 Run Enrollment Algorithm
 Run Distributed Key Generation Algorithm
end for
<u>Evaluation Stage</u>
for all Participants $p_i \in \mathcal{P}$ do
 fix current timestamp $\tau$
 for Share index $\ell \in \{i, 2i\}$ do
  Choose a random $y_\ell \in \mathbb{F}_q$
  Compute and broadcast $B_\ell = y_\ell \cdot G$ mod p to all $d_i \in \mathcal{D}$
 end for
 for Share index $\ell \in \{i, 2i\}$ do
  Recover share $r_\ell \leftarrow$ PUF-Retrieve-External(E($p_i^{pub}$, k), $E_k(r_\ell)$)
  Compute $$B = y \cdot G = \sum_{i=1}^{2t} B_i \text{ mod } p$$

$$e = \text{Hash}(G, B, \mathcal{P}^{pub}, \tau)$$

$$M_\ell = y_\ell + r_\ell e \left( \prod_{\substack{j=1 \\ j \neq i}}^{2t} \frac{-j}{\ell - j} \right) \text{ mod } q$$

Send ($B_i$, $M_i$, $B_{2i}$, $M_{2i}$, $\tau$) to verifier $\mathcal{V}$
 end for
end for

---

Figure 4:
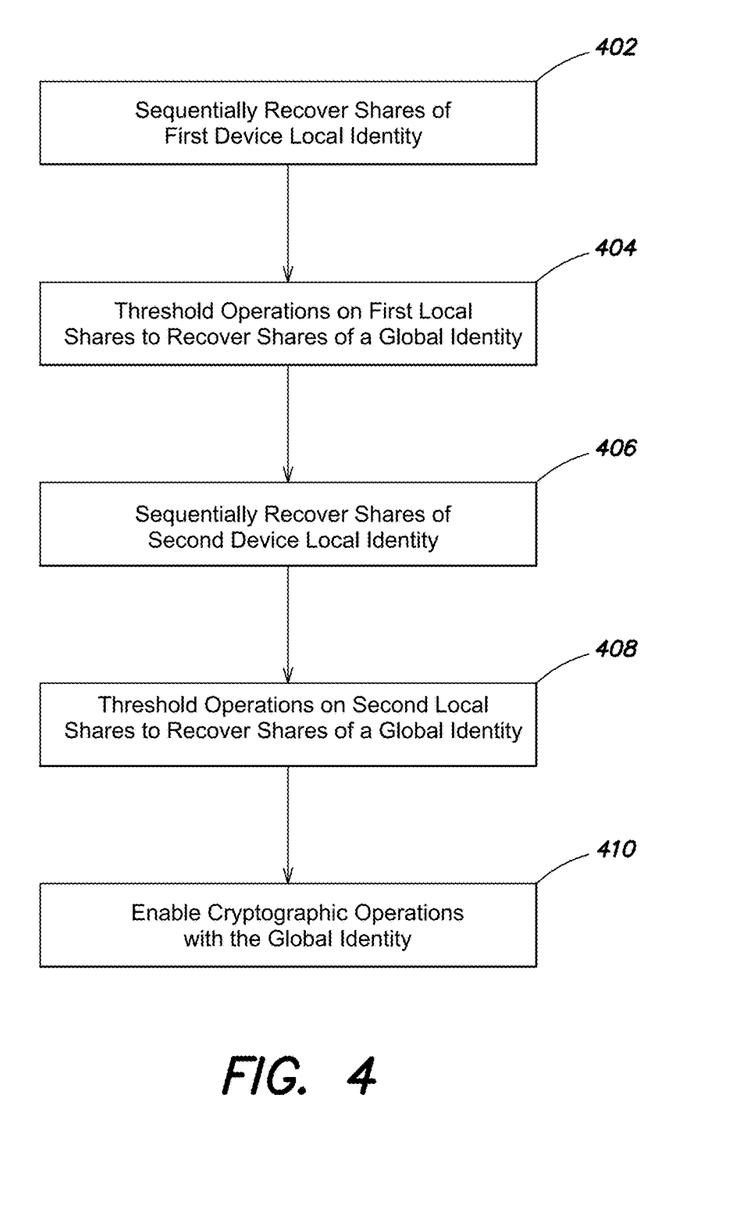
FIG. 4 illustrates an example process flow for using a global identity, according to one embodiment.

FIG. 4 begins at 402 with sequentially recovering shares of a local identify for a first device. In various embodiments, shares are received are described above. In one example, challenges are issues to a PUF circuit or other hardware identity circuit to recover a first share of a private key or secret. The challenges triggers a PUF response that is use with a helper value to map to shares of the local identity. The operations to recover the shares can be staggered so only one share of the local identity is memory at a time (e.g., a compute cycle, a few processor ticks, etc.). A threshold operation can be executed on the first share (e.g., at 404) and the results of the operations stored in memory to be combined with subsequent threshold operations so to prevent any share for being in memory longer than needed to compute the threshold operation. Algorithm 3 illustrates an example approach for using threshold operations.

Further challenges are issued to the PUF circuit or other hardware identity circuit ("HIC") to recover a second share (e.g., at 402) and executed threshold operations (e.g., at 404). The output of the threshold operations is used to sequentially recover shares of a global identity, again the execution can be constrained to limit shares in memory to one global share. According to one embodiment, by limiting shares in memory, the best an adversary can accomplish is to capture one share of an identity and by capturing the one share prevent recovery of the second share owing to the properties of PUF or HIC circuits. In further embodiments, a global identity can be shared across any number of devices, and for example steps 402-404 can be executed for each device holding shares of the global identity. Various embodiments use 2, 3, 4, 5, 6, 7, 8, 9, 10, 11, and even hundreds of devices holding multiple shares of a global identity.

At 406 and 408 the steps for local and global identity recovery are executed on a second device to recover shares of the global identity held by the second device. In some embodiments, the execution can occur at a first device and then at a second device, however, no ordering is required between the first and second device. In further embodiments, recovery at the first and second device can proceed in parallel. Once enough shares of the global identity are recovered, at 410 any cryptographic operations can be performed. Again, rather than store shares of the global identity in memory, threshold operations can be executed on each global shares as it is recover and the outputs of the threshold operations used to enable the cryptographic operation (e.g., encrypt, decrypt, digitally sign, etc.) at 410.

Various embodiments can implement a global identity across a plurality of devices, where each device also has its own identity (e.g., public key and shared secret). Further embodiments can implement a global identity across a plurality of components that make up a singular system or a distributed system. In some examples, the components can use a common processor and/or memory. In other examples, each component can be a device with a processor, memory, and network interface for interacting with other components. The individual component can encode multiple shares of the global identity using respective local identities associated with the respective components.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An authentication system including a plurality of components for jointly executing cryptographic operations based on a shared encoded global identity, the system comprising:
   at least a first component and a second component having respective hardware intrinsic identity circuits for generating hardware specific outputs, wherein the hardware intrinsic identity circuits are constructed such that physical tampering changes properties of hardware and the hardware specific outputs; and
   at least one processor configured to:
      obtain a first plurality of shares associated with a first encoded local identity of the first component using a first hardware intrinsic identity circuit of the first component;
      recover at least a first and a second share of the encoded global identity based on combining outputs of threshold operations on the first plurality of shares;
      obtain a second plurality of shares associated with a second encoded local identity of the second component using a second hardware intrinsic identity circuit of the second component;
      recover at least a third and a fourth share of the encoded global identity based on combining outputs of threshold operations on the second plurality of shares; and
      enable execution of a cryptographic operation that employs the encoded global identity based on combining outputs of threshold operations on recovered shares of the encoded global identity, wherein the threshold operations obscure the recovered shares of the encoded global identity, and wherein compromise of a threshold number of local identity shares prevents recovery of the encoded global identity.

2. The system of claim 1, wherein the at least one processor is configured to map challenges and respective helper values to at least some of the first plurality of shares associated with the first encoded local identity of the first component.

3. The system of claim 1, wherein the at least one processor is configured to map challenges and respective helper values to at least some of the second plurality of shares associated with the second encoded local identity of the second component.

4. The system of claim 1, wherein only one share of an associated identity is in memory at a time.

5. The system of claim 1, wherein the first component includes a first processor, and a first communication interface.

6. The system of claim 5, wherein the second component includes a second processor, and a second communication interface.

7. The system of claim 1, wherein the at least one processor is configured to enroll at least the first component and the second component into the encoded global identity, and encode respective shares of the encoded global identity based on the first encoded local identity of the first component and the second encoded local identity of the second component.

8. The system of claim 7, wherein the at least one processor is configured to define, during enrollment, a threshold sharing of the encoded global identity between at least the first component and the second component that requires a minimum of two shares from a minimum of two devices to enable execution of cryptographic operations that employ the encoded global identity.

9. The system of claim 7, wherein the at least one processor is configured to:
   during enrollment, define a threshold sharing of the encoded global identity that requires a minimum of two shares from one component to enable cryptographic operations that employ the encoded global identity.

10. A computer implemented method for jointly executing cryptographic operations based on an encoded global identity, the method comprising:
    obtaining, by at least one processor, a first plurality of shares associated with a first encoded local identity of a first component using a first hardware intrinsic identity circuit of the first component, wherein tampering with the first hardware intrinsic identity circuit changes properties of hardware of the first hardware intrinsic identity circuit;
    recovering, by the at least one processor, at least a first share and a second share of the encoded global identity based on combining outputs of threshold operations on the first plurality of shares;
    obtaining, by the at least one processor, a second plurality of shares associated with a second encoded local identity of a second component using a second hardware intrinsic identity circuit of the second component, wherein tampering with the second hardware intrinsic identity circuit changes properties of hardware of the second hardware intrinsic identity circuit;
    recovering, by the at least one processor, at least a third share and a fourth share of the encoded global identity based on combining outputs of threshold operations on the second plurality of shares; and
    enabling execution of a cryptographic operation that employs the encoded global identity based on combining outputs of threshold operations on recovered shares of the encoded global identity, wherein the threshold operations obscure the recovered shares of the encoded global identity, and wherein compromise of a threshold number of local identity shares prevents recovery of the encoded global identity.

11. The method of claim 10, further comprising mapping, by the at least one processor, challenges and respective helper values to the first plurality of shares associated with the first encoded local identity of the first component.

12. The method of claim 10, further comprising mapping, by the at least one processor, challenges and respective helper values to the second plurality of shares associated with the second encoded local identity of the second component.

13. The method of claim 10, wherein only one share of an associated identity is in memory at a time.

14. The method of claim 10, wherein the first component includes the first hardware intrinsic identity circuit, a first processor, and a first communication interface, and an act of combining outputs of threshold operations on the first plurality of shares is executed on the first processor.

15. The method of claim 14, wherein the second component includes the second hardware intrinsic identity circuit, a second processor, and a second communication interface, and an act of combining, outputs of threshold operations on the second plurality of shares is executed on the second processor.

16. The method of claim 10, further comprising:
enrolling, by the at least one processor, at least the first component and the second component into the encoded global identity; and
encoding, by the at least one processor, respective shares of the encoded global identity based on the first encoded local identity of the first component and the second encoded local identity of the second component.

17. The method of claim 16, wherein the act of enrolling includes defining, by the at least one processor, a threshold sharing of the encoded global identity between at least the first component and the second component to require a minimum of two shares from a minimum of two devices to enable cryptographic operations that employ the encoded global identity.

18. The method of claim 17, wherein the act of enrolling includes defining, by the at least one processor, a threshold sharing of the encoded global identity to require a minimum of two shares from one component to enable cryptographic operations that employ the encoded global identity.

19. An authentication device including a plurality of components for jointly executing cryptographic operations based on an encoded global identity, the system comprising:
a plurality of components having hardware intrinsic identity circuits configured to generate respective hardware specific outputs, wherein the hardware intrinsic identity circuits are constructed such that physical tampering changes properties of hardware and the hardware specific outputs; and
at least one processor configured to:
for each of respective ones of the plurality of components, obtain a respective plurality of shares associated with a respective encoded local identity of the respective component using a respective hardware intrinsic identity circuit of the respective component;
recover a plurality of shares of the encoded global identity based on combining outputs of threshold operations on pluralities of shares obtained for the respective components; and
enable execution of a cryptographic operation that employs the encoded global identity based on combining outputs of threshold operations on the plurality of shares of the encoded global identity, wherein the threshold operations obscure the plurality of shares of the encoded global identity, and wherein compromise of a threshold number of local identity shares prevents recovery of the encoded global identity.

20. The device of claim 19, wherein the at least one processor is configured to define a threshold sharing of the encoded global identity between the plurality of components that requires a minimum of two shares from a minimum of two devices to enable cryptographic operations that employ the encoded global identity.

* * * * *